Patented Apr. 28, 1953

2,636,885

UNITED STATES PATENT OFFICE 2,636,885

SUBSTITUTED BENZOFURANES

Robert W. Wynn and Samuel A. Glickman, Easton, Pa., assignors to General Aniline & Film Corporation, New York, N. Y., a corporation of Delaware No Drawing. Application April 30, 1952, Serial No. 285,324

5 Claims. (Cl. 260—346.2)

1

This invention relates to new phenolic compounds which may be represented by the following formula:

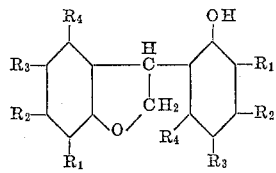

wherein $R_1$, $R_2$, $R_3$ and $R_4$ are each hydrogen, chlorine, bromine, iodine, methyl, ethyl, methoxy or ethoxy, at least one of these radicals being a halogen. It also relates to a process for preparing such compounds.

These novel compounds are useful as fungicides and germicides, especially as germicides in substantially neutral detergents such as dilute aqueous solutions of lauryl sulfate or the like detergents.

It has been found in accordance with the invention that these novel compounds may be prepared in a convenient manner by condensing about 2 mols of the corresponding substituted phenol with one mol of dimethyl chloroacetal in the presence of 85 to 100% sulfuric acid at a temperature of 0 to 50° C., using an amount of the acid in the range of about 1 to 5 times the weight of the acetal, and then heating an alkaline aqueous solution of the resulting reaction product at a temperature in the range of 75 to 100° C., and recovering the desired compound.

The objects achieved in accordance with the invention as described herein include the provision of new compounds of the above-described type which are useful as fungicides and germicides; the provision of a convenient method for preparing such compounds; the provision of germicidal detergent compositions containing such compounds; and other objects which will be apparent as details or embodiments of the invention are set forth hereinafter.

In order to facilitate a clear understanding of the invention the following preferred specific embodiments are described in detail:

Example 1

In a suitable reaction vessel (having a glass inner surface) equipped with an agitator, there are charged 62.5 parts by weight of 2,4 dichlorophenol and 550 parts of about 96% aqueous sulfuric acid. This mixture is cooled to about 5° C., and then a solution of 25 parts of dimethyl chloroacetal dissolved in about 40 parts of methanol is gradually added thereto over a 5-hour period.

2

The reaction mixture is further agitated for 45 minutes, drowned in an ice-water mixture, and the viscous precipitate washed twice with cold water by decantation. On standing, this product solidifies. It is steam distilled to remove unreacted dichlorophenol, and the residue is dissolved in water containing just enough sodium hydroxide to make the solution basic to phenolphthalein. This solution is heated to 90° C. and filtered, and the filtrate is acidified to Congo blue by adding hydrochloric acid. The resulting precipitate is separated by filtration, and washed acid-free with water. It is then recrystallized from xylene, and then again recrystallized from methanol. 28 parts of product is obtained, melting at 147–8° C. This product corresponds to the formula:

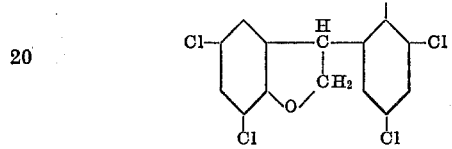

Solutions of this product in a substantially neutral aqueous solution of a detergent such as lauryl sulfate, containing about 0.01 to about 0.5% of the above product show good bactericidal and bacteriostatic activity when tested against Staphylococcus aureus by the usual methods. For instance, it compares favorably in bactericidal activity, and it is bacteriostatically superior to halogenated methylene-bis-phenol compounds such as those described in U. S. Patent 2,535,077, in such solutions.

Example 2

Following the above procedure, 128.6 parts of 4-chlorophenol is dissolved in 300 parts of glacial acetic acid, and 150 parts of about 97% aqueous sulfuric acid is added thereto gradually, while maintaining a temperature of about 20–25° C. The resulting mixture is cooled to about 10° C., and 75 parts of dimethyl chloroacetal is gradually added thereto over a 1-hour period, while the temperature is maintained at about 10° C. The resulting reaction mixture is agitated at 10–15° C. for about 18 hours, and then drowned in an ice-water mixture. The resulting precipitated gummy solid is taken up in ether, the ether solution concentrated by evaporating ether, and then subjected to steam distillation to remove unreacted chlorophenol. The residue is taken up in about 250 parts of 4 molar aqueous sodium hydroxide, while heating at 85–90° C. for about 1 hour. The resulting clear solution is cooled and gradually added to an ice-water mixture to which has been added about 75 parts of 36% hydrochloric acid. The resulting precipitated solid is separated by filtration, washed with water and then taken up in diethyl ether. Upon evaporation of the ether from the resulting solution, 133 parts of material is obtained. This is submitted to crystallization from a 1 to 1 mixture of xylene and petroleum ether, followed by recrystallization from about 75% aqueous ethanol. The resulting product melts at 196–7° C., and corresponds to the formula:

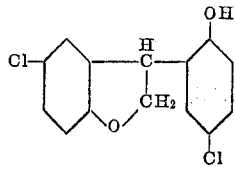

Analysis for chlorine:
Found: 24.65%
Theory: 25.23%

*Example 3*

Following the above procedure, 19.7 parts of 2,4,5-trichlorophenol is mixed with 550 parts of 96% aqueous sulfuric acid, and the mixture is heated to 50° C. Then 6.3 parts of dimethyl chloroacetal is gradually added thereto over a 2-hour period, while maintaining the temperature at 50° C., and the resulting mixture is further agitated for 1 hour at this temperature. Then it is cooled and added to about 800 parts of an ice-water mixture; and the precipitate separated and washed twice with cold water by decantation. It is then steam distilled to remove unreacted trichlorophenol, and the residue is filtered off and then taken up in about 200 parts of boiling water containing about 3 parts of sodium hydroxide. The resulting solution is cooled, and a small amount of insoluble material is separated by filtration. The filtrate is acidified to Congo blue by adding 6 normal hydrochloric acid. The precipitate is separated by filtration, washed acid-free with cold water, and dried. It is then recrystallized from toluene, and further recrystallized from about 75% aqueous ethanol. The resulting product melts at 214–5° C., and corresponds to the formula:

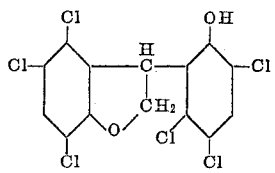

Comparable results to the foregoing are obtained with various modifications thereof, such as the following: Different phenols or mixtures of phenols are used, the particular substituents being selected to provide compounds of the above-mentioned general formula. These may be typified by: m-chloro-6-isopropyl-m-cresol, 4-chloro-2-iodophenol, o-cresol, 4-bromo-o-cresol, 4-chloro-m-cresol, 5-bromo-m-cresol, 3-chloro-p-cresol, 2,5-dichloro-p-cresol, 3-bromo-p-cresol, p-methoxyphenol, m-methoxyphenol, m-ethoxyphenol, p-ethoxyphenol and 2-methoxy-p-cresol. About 2 mols of the appropriate substituted phenol is used with about 1 mol of the dimethyl chloroacetal, and the latter is added to a solution of the phenol in 85 to 100% aqueous sulfuric acid, at a temperature in the range of 0 to 50° C., the amount of the acid being in the range of about 1 to 5 times the weight of the acetal. The resulting reaction mixture is dissolved in an aqueous alkali and heated to a temperature in the range of 75 to 100° C., e. g. for about ½ to 1½ hours, the product being recovered by precipitation (by acidification), separation of the resulting precipitate, and recrystallization thereof from a suitable solvent such as a hydrocarbon of the type of xylene, petroleum ether, or mixtures thereof. If desired, the product may be further refined by recrystallization from a lower alkanol containing 1 to 3 carbon atoms or an about 50 to 95% aqueous solution of the alkanol. If desired, a solvent other than glacial acetic acid may be used in the reaction mixture, but for economic reasons, it is preferred to avoid such solvents.

The above-described bactericidal and bacteriostatic activity of these compounds is indeed surprising, when one considers that they have only half as many phenolic groups per molecule as the prior art bis-phenolic type compounds.

In view of the foregoing disclosures, variations and modifications of the invention will be apparent to one skilled in the art, and it is intended to include within the invention all such variations and modifications except as do not come within the scope of the appended claims.

We claim:
1. A compound of the formula:

$$\text{(formula with } R_1, R_2, R_3, R_4 \text{ substituents)}$$

wherein each of the radicals $R_1$, $R_2$, $R_3$ and $R_4$ is selected from the class consisting of hydrogen, chlorine, bromine, iodine, methyl, ethyl, methoxy and ethoxy radicals, at least one of said radicals being a halogen.

2. The compound of claim 1 wherein each of the radicals $R_1$ and $R_3$ is chlorine, and each of the radicals $R_2$ and $R_4$ is hydrogen.

3. The compound of claim 1 wherein the radical $R_3$ is chlorine and each of the radicals $R_1$, $R_2$ and $R_4$ is hydrogen.

4. The compound of claim 1 wherein each of the radicals $R_1$, $R_2$ and $R_4$ is chlorine, and $R_3$ is hydrogen.

5. A process for preparing the compound of claim 1 which comprises condensing about 2 mols of the corresponding substituted phenol with 1 mol of dimethyl chloroacetal in the presence of 85 to 100% aqueous sulfuric acid at a temperature in the range of 0 to 50° C., the amount of the sulfuric acid being in the range of about 1 to 5 times the weight of the acetal, heating an aqueous alkaline solution of the resulting product to a temperature of 75 to 100° C., and then acidifying the solution and recovering the desired product.

ROBERT W. WYNN.
SAMUEL A. GLICKMAN.

No references cited.